Jan. 12, 1954   A. ENS   2,665,569
ADJUSTABLE GEAR

Filed March 27, 1952   2 Sheets-Sheet 1

Inventor
ARTHUR ENS
by
Attorney

Jan. 12, 1954

A. ENS 2,665,569

ADJUSTABLE GEAR

Filed March 27, 1952

Inventor
ARTHUR ENS
by
Attorney

Patented Jan. 12, 1954

2,665,569

UNITED STATES PATENT OFFICE 2,665,569

ADJUSTABLE GEAR

Arthur Ens, Hepburn, Saskatchewan, Canada

Application March 27, 1952, Serial No. 278,821

4 Claims. (Cl. 64—25)

This invention relates to improvements in a cam shaft gear and appertains particularly to one for automatically advancing the valve timing of an internal combustion engine in response to the increase in engine speed.

An object of the invention is to provide an automatic cam shaft gear whereby the rotative position of the driven shaft is advanced with respect to the gear ring proportionate with the increase in the engine speed.

A further object of the invention is to provide a novel, governor-controlled coupling between the gear ring and cam shaft.

A still further object of the invention is the provision of a reliable and efficient coupling for automatically varying the rotative relation of a floating gear ring and its supporting shaft of the nature and for the purpose described that is characterized by structural simplicity and reasonable cost of production whereby the same is rendered commercially desirable.

To the accomplishment of these and related objects as shall become apparent as the description proceeds, the invention resides in the construction, combination and arrangement of parts as shall be hereinafter more fully described, illustrated in the accompanying drawings, and pointed out in the claims hereunto appended.

The invention will be best understood and can be more clearly described when reference is had to the drawings forming a part of this disclosure wherein like characters indicate like parts throughout the several views.

Figure 1:
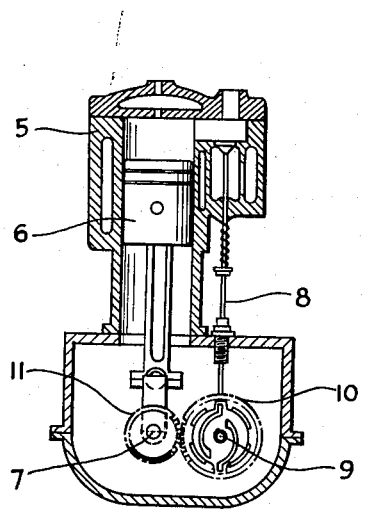
Figure 1 is a vertical section through the forward end of an internal combustion engine showing the application of this automatic timing gear to the valve operating cam shaft.
Figure 2:
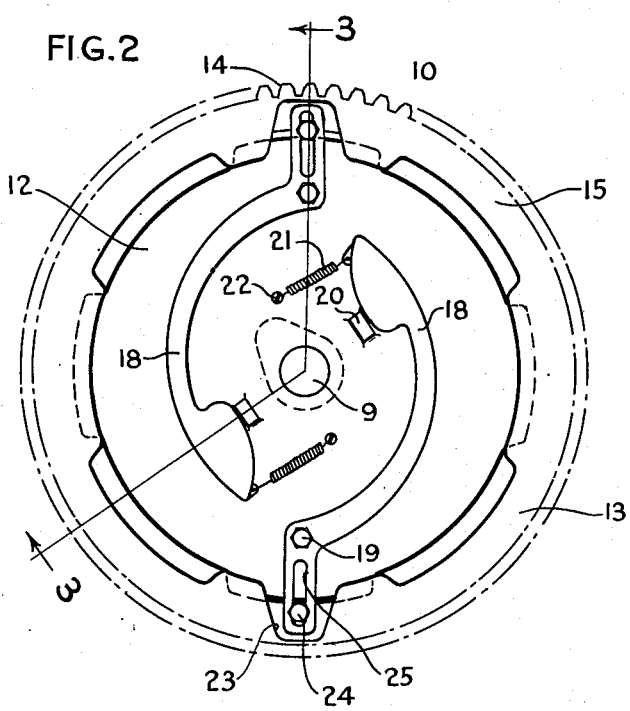
Figure 2 is an enlarged front elevation of the automatic cam shaft-advancing gear.
Figure 3:
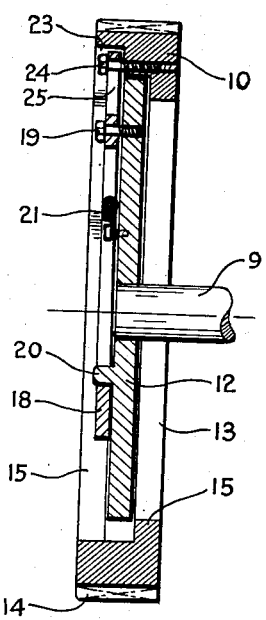
Figure 3 is a section therethrough, as taken on the lines 3—3 of Figure 2.
Figure 4:
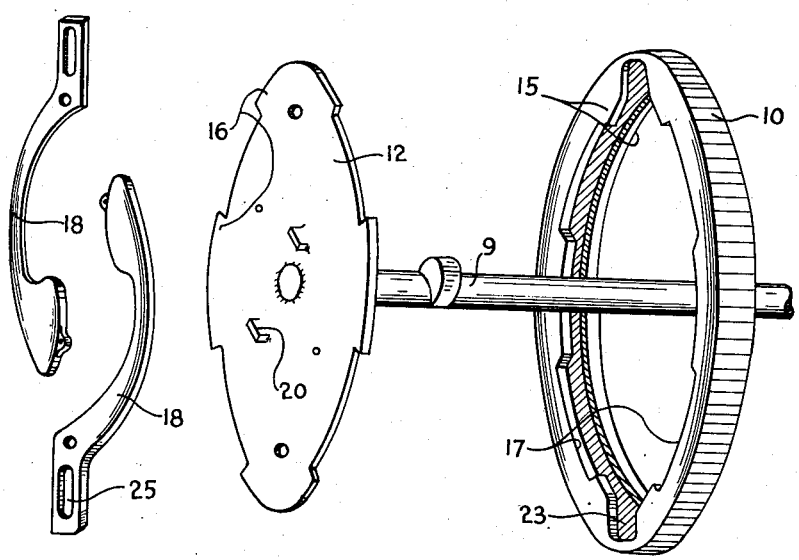
Figure 4 is an exploded-type perspective view of the principal parts.

In the internal combustion engine 5, seen in Figure 1, 6 designates the piston, 7 the crank shaft, 8 the valve and valve-stem assembly and 9 the valve cam shaft. The cam shaft 9 has a gear 10 driven by a pinion 11 on the crank shaft 7.

The cam shaft gear 10 with which the present invention is especially concerned, is in the nature of a coupling that allows, or rather causes, a relative rotative movement of several degrees between the periphery of the gear 10 that meshes with the crank shaft pinion 11 and the supporting cam shaft 9. To this end the gear 10 consists of a disk or plate 12 secured on the cam shaft 9 and a concentric gear ring 13 in the form of a channel, having a toothed rim 14 and a spaced pair of lateral flanges 15 extending inwardly therefrom, that straddles the periphery of the disk.

The disk is divided into eight sectors with four alternate ones having a greater diameter than the other four to provide four circumferentially spaced wings 16. At the wings 16 the disk is of greater diameter than the interior diameter of the channel gear ring 10 and so to admit the disk thereto, one lateral flange 15 has correspondingly spaced, circumferentially elongated radially notches 17. Thus when the wings 16 on the disk 12 and the notches 17 in one flange of the gear ring 10 are in registry the parts may be assembled and then are secured against separation by the rotation of one part relative to the other through approximately 45 degrees.

A companion pair of centrifugal governor-type arms 18 are pivoted intermediate their ends on the plate 12 near diametrically opposite edges by the bolts 19, their inner ends circling opposite sides of the cam shaft end 9 and are normally held against stops 20 projecting laterally from the plate 12 by retractile coil springs 21 stretched to the free inner ends of the arms 18 from inwardly spaced anchor screws 22. The outer ends of the governor arms 18 extend radially from the pivot bolts 19 substantially beyond the rim of the plate 12 being accommodated in diametrically opposite deep radial pockets 23 in the notched flange 15 that reach outwards beyond the base of the channel-like groove and are there connected to the gear rim member 10 by bolts 24 that pass through elongated slots 25 in the governor arms 18 so that said arm can both swivel and slide longitudinally on said bolts. It will thus be seen that the attachment of the governor arms 18 serves to secure the assembly of this compound gear by preventing sufficient relative rotation of the plate and gear ring as would bring the wings and notches into registry and allow of the lateral separation of the plate and ring.

In operation, as the speed of rotation of the gear 10, driven by the main crank shaft pinion 11, increases the governor arms 18 swing outwards on their pivots 19 causing the plate 12, that carries the cam shaft 9, to rotate through a small angle with respect to the gear ring 10; then when the speed decreases, the governor arms under the reduced force and the pull of the springs 21 swing inwards toward their stops 20 with the concurrent relative rotation of the gear parts in reverse directions. It is proposed to use such an automatic variable gear in an internal combustion engine to advance the operation of the intake and exhaust valves as the engine R. P. M.'s rise to the end that the engine develops more power and speed, accelerates more rapidly, generates less heat, operates more economically; however, other use may be made of it in any installation where it is desired to have an automatic, speed-responsive variation of the rotative relation of the shaft and gear. Even in the application of the invention to an internal combustion engine it may be desired to provide advance operation for the intake valves only, in which case an engine would require separate cam shafts to the intake valves and exhaust valves respectively and only the cam shaft for the intake valves would be equipped with this new gear.

From the foregoing description taken in connection with the accompanying drawings, it will be manifest that a cam shaft gear is provided that will fulfil all the necessary requirements of such a device but as many changes could be made in the above description and many apparently widely different embodiments of the invention may be constructed within the scope of the appended claims without departing from the spirit or scope thereof, it is intended that all matters contained in the said accompanying specification and drawings shall be interpreted as illustrative and not in a limitative or restrictive sense.

Having thus described the invention, what is claimed as new is:

1. An automatic, speed-responsive, shaft-advancing gear comprising the combination with a rotatable shaft of a disk secured thereon, an interiorly channelled gear ring concentric with and straddling said disk and rotatable with respect thereto, and normally spring-retracted centrifugal governor-type arms each pivoted intermediate its ends on said disk near the periphery thereof and having one end with an elongated slot therein extending radially beyond the circumference of the disk and connected with said gear ring by a bolt passing through said slot; whereby on the hinging of said centrifugal governor-type arms in response to the speed of rotation of said shaft said gear ring is caused to move rotarily with respect to said shaft carried disk.

2. An automatic shaft-advancing gear, according to claim 1, wherein said disk has spaced, radially extended, circumferential wings and said gear ring consists of a toothed periphery and a spaced pair of lateral flanges and has correspondingly spaced circumferential notches on the inner edge of one of its side flanges whereby said disk may be laterally inserted in said gear ring and secured against separation by rotation with respect thereto.

3. For an internal combustion engine cam shaft, a two part centrifugally operated gear for advancing the valve operating cam shaft in response to greater engine speed comprising a disk having circumferentially spaced radially extended wings; a channel gear ring consisting of a toothed periphery and spaced pair of lateral flanges having circumferentially spaced elongated notches on the inner edge of one of such side flanges; said notches being of a spacing, length and depth for registry by and admission of the radial wings of said disk, whereby said disk may be laterally inserted in said gear ring and on rotative movement with respect to said ring may be locked therein against lateral displacement; arms evenly spaced and laterally applied to said disk, each being attached intermediate its ends to said disk near the periphery thereof by a pivot pin and having a weight on one end and provided with an elongated slot in the other end that extends radially beyond the circumference of the disk and is connected with said gear ring by a bolt passing through said slot; whereby on the hinging of said weighted arms, in response to the speed of rotation of said two part gear, said gear ring is caused to move rotarily with respect to said shaft carried disk.

4. The combination with the structure set forth in claim 3 wherein said gear ring has pockets in one lateral face thereof for the accommodation of the slotted ends of the respective arm and wherein the connection of said arms to said disk and said gear ring respectively, which occurs in the assembled gear when the wings of said disk are in disk-retaining position out of registry with the notches in said gear ring flange, serves to limit the relative rotation of said disk and said gear ring to too small an angle to allow of the lateral separation of said disk and gear ring.

ARTHUR ENS.

References Cited in the file of this patent

UNITED STATES PATENTS

| Number | Name | Date |
|---|---|---|
| 1,957,181 | Mitchell | May 1, 1934 |

FOREIGN PATENTS

| Number | Country | Date |
|---|---|---|
| 303,886 | Great Britain | May 30, 1929 |